United States Patent [19]
Kennedy et al.

[11] Patent Number: 5,422,952
[45] Date of Patent: Jun. 6, 1995

[54] DYNAMIC RADIO COMMUNICATIONS SYSTEM

[75] Inventors: John B. Kennedy, Nutley; Joseph Heinen, Montville, both of N.J.

[73] Assignee: ITT Corporation, New York, N.Y.

[21] Appl. No.: 892,584

[22] Filed: Jun. 3, 1992

[51] Int. Cl.⁶ .................................. H04L 9/00
[52] U.S. Cl. ............................. 380/23; 380/9; 380/25; 380/34; 380/49; 375/200; 370/18; 370/19
[58] Field of Search ............ 375/1; 380/9, 23, 25, 380/34, 49; 370/18, 19, 21

[56] References Cited

U.S. PATENT DOCUMENTS

| | | | |
|---|---|---|---|
| 4,317,204 | 2/1982 | Gordy et al. | 375/1 |
| 4,325,140 | 4/1982 | Stitzer | 455/19 |
| 4,520,476 | 5/1985 | Searl | 370/32 |
| 5,228,854 | 7/1993 | Eldridge | 434/11 |

*Primary Examiner*—Bernarr E. Gregory
*Attorney, Agent, or Firm*—Arthur L. Plevy; Patrick M. Hogan

[57] ABSTRACT

A communication system includes a plurality of subscribers each of said subscribers having a transceiver including a transmitter and a receiver. In the system there are means coupled to each of said transceivers to enable said transmitter to transmit a unique waveform having a predetermined time, frequency and phase code and each transceiver includes means coupled to the receiver to enable anyone of said subscribers to receive any transmitted waveform while others of the subscribers including those receiving said waveform can simultaneously transmit other unique waveforms whereby any subscriber can receive any transmitted waveform while simultaneously transmitting another waveform.

20 Claims, 8 Drawing Sheets

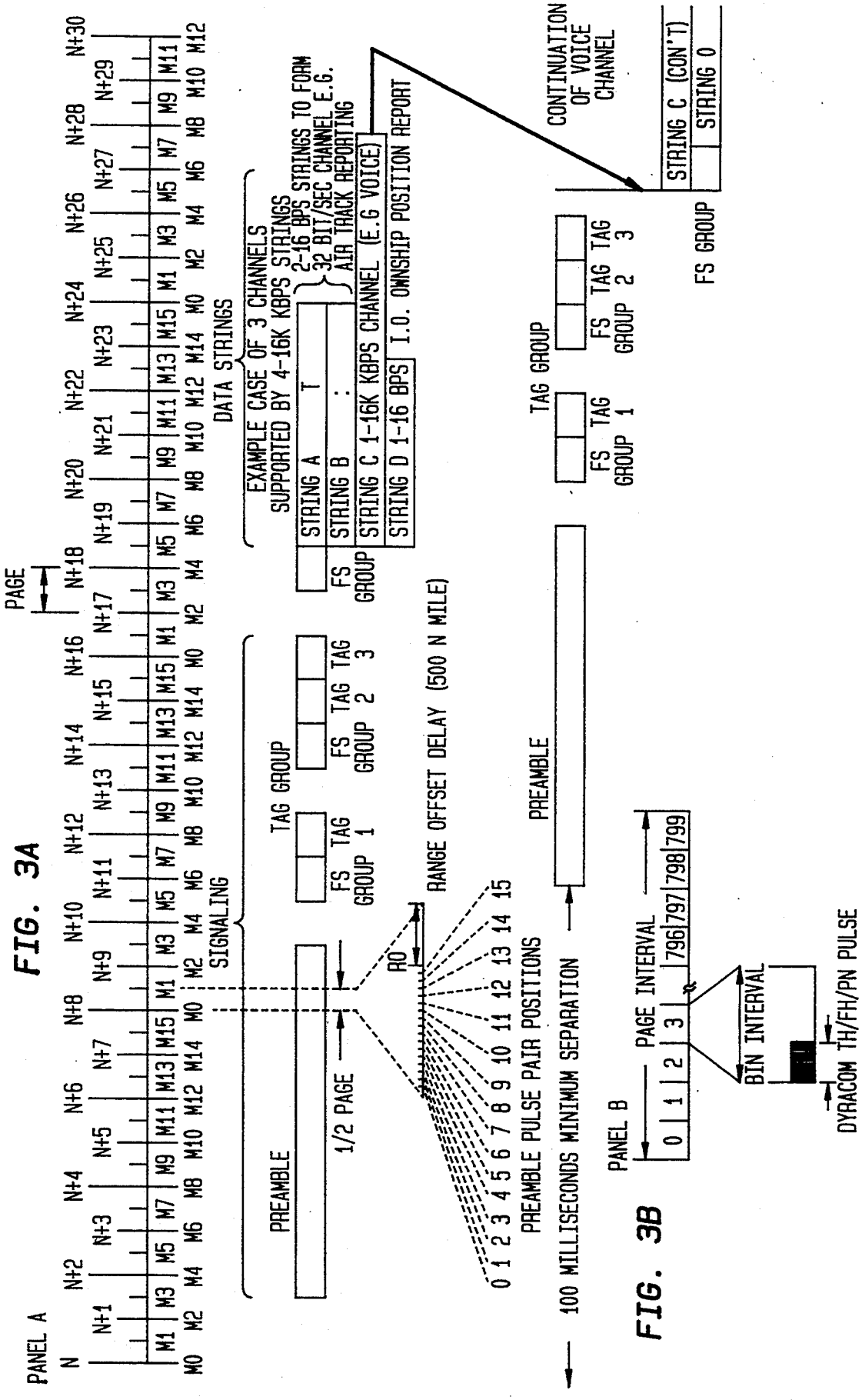

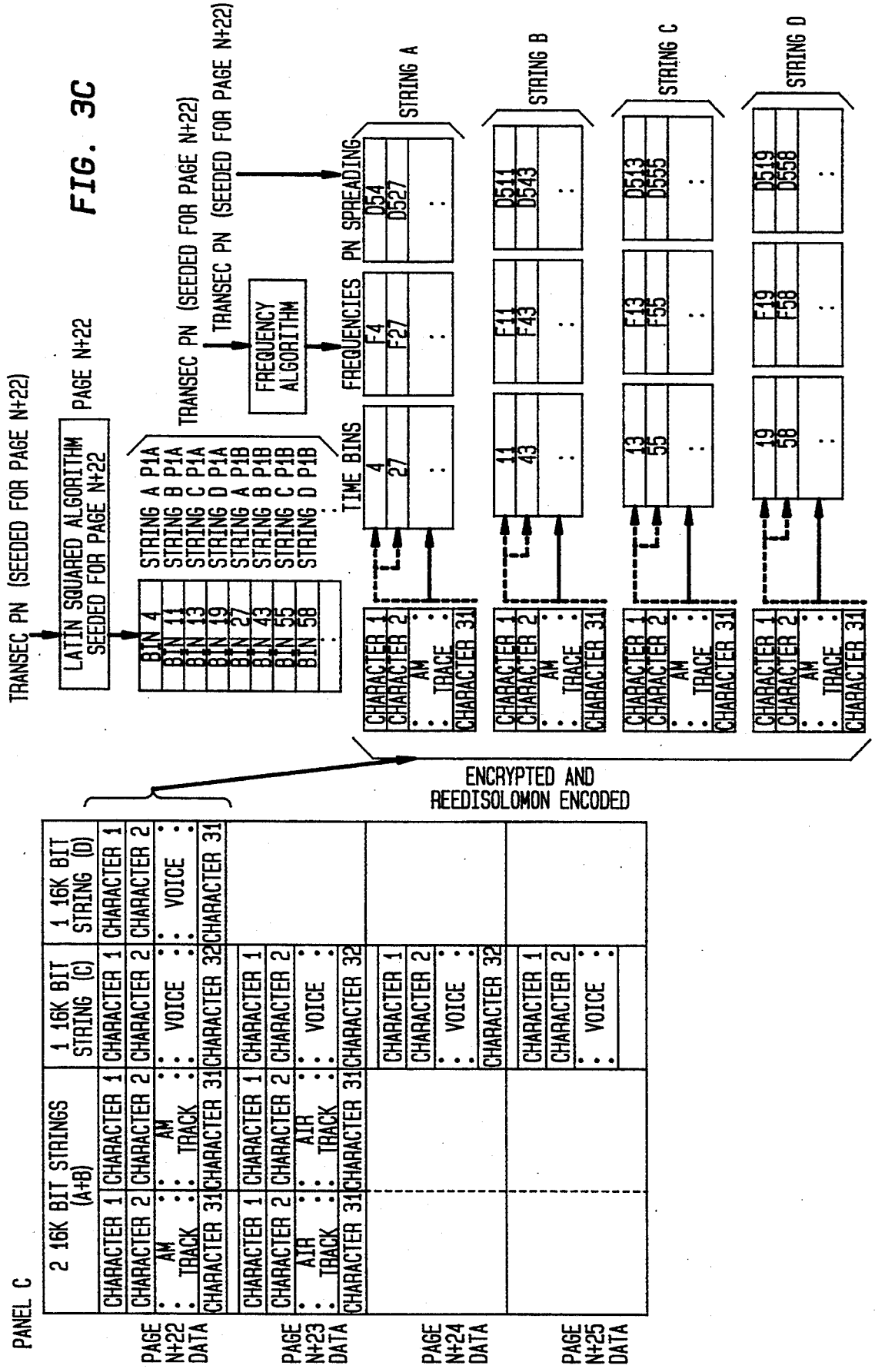

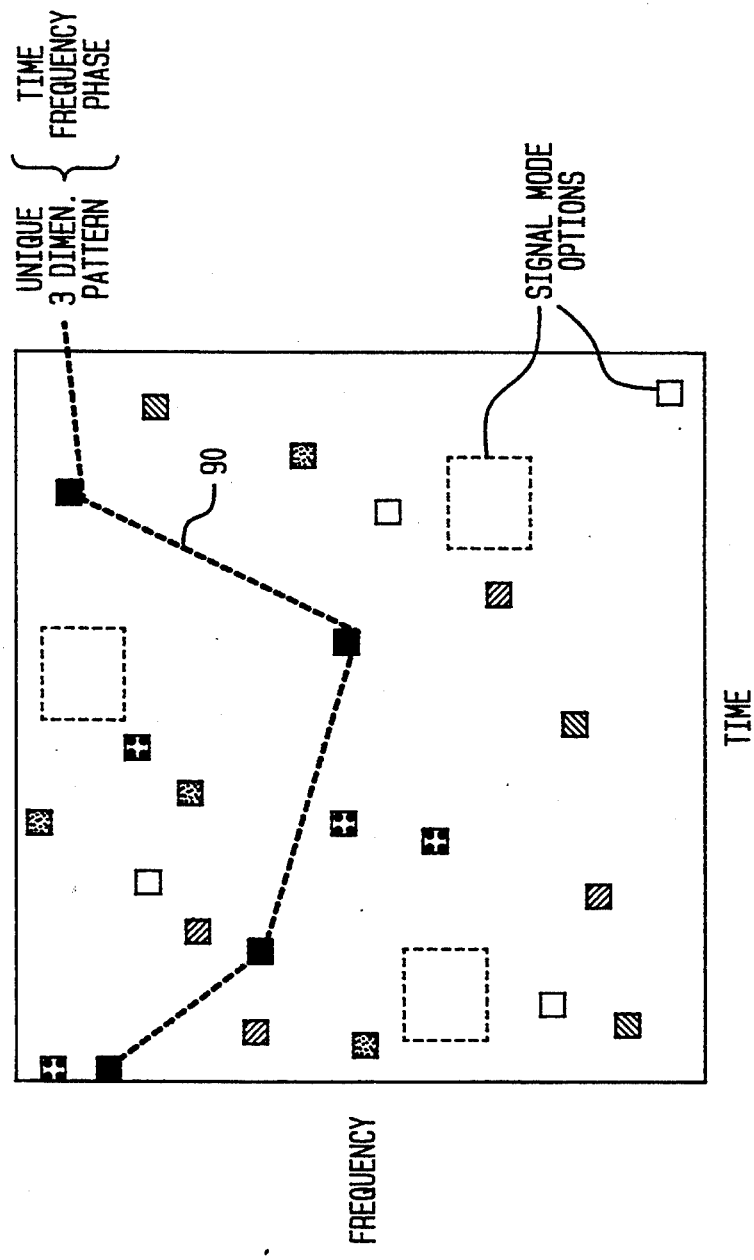

DYNAMIC RADIO COMMUNICATIONS SYSTEM

FIELD OF THE INVENTION

This invention relates to a communications system in general and more particularly to a communications system which increases communication capacity, while allowing for the simultaneous reception and transmission of data.

BACKGROUND OF INVENTION

Existing communication systems are sender directed. That is, such systems enable a calling or a transmitting party to contact any one of a plurality of receivers to transmit and receive data to and from the called receiver based on a connection. The sender directed system operates to provide a communications link one at a time. In this way, either a designated frequency or some code indicative of each location is a messenger. For example in systems such as telephone systems, any party can call another party within a wide spectrum of subscribers or conference calls can be made. Subscribers require the dialing of a unique code whereby each subscriber to the systems has a code (telephone number) at which he can be reached. Thus, connections can only be made based on the knowledge of this code or based on a particular frequency in regard to other systems and so on. Such systems do not allow independence of use or concurrency. They require either time connection or compatible frequencies to afford communications. The system enables only "called" parties to communicate with "calling" parties.

The present system, which will be described, operates in a manner to provide independence of use while providing omni-directional propagation in the radio medium. The present system is capable of concurrent activities through multiple sources and essentially allows information exchange which results from use of a time dispersed redundancy coded signal format which also allows timing and access flexibility, concurrency, and independence of users and usages. The system to be described is distinctly different from the traditional systems as the system supports simultaneous transmissions where all transmitted signals are presented at each site for reception, even if the transceivers are transmitting to and receiving from others.

As one will understand, the system operates similar to acoustic communications which occur at a cocktail party. In this manner a great number of people can communicate with each other or with anyone across the room and so on. Hence, each of the participants of a cocktail party can communicate with any other person at that party and do so while talking and with more than one person listening or engaging in the conversation. There is no communication system according to the prior art which operates according to this analogy.

As will be explained, the present communication system allows every single subscriber to have access to every single transmitted message and to receive any message so desired with any message capable of being received by more than one unit and capable of being received while the unit is transmitting. Thus by eliminating conflicts, as compared to prior art communication systems the system increases capacity by an order of magnitude, gives each subscriber total accessibility to the community transmissions, and allows each subscriber to select for reception only data which is relevant to itself. The system operation, essentially, can be analogized to the brief description of the cocktail party as indicated above.

The system is particularly suited for military communications, as existing communications equipment will not meet the requirements resulting in emerging operational needs to better coordinate dynamic tactical engagements. Traditional communication structures are poorly suited for the dynamics of coordinating functions such as sensor coordination, detection enhancement, targeting, maneuver coordination, weapon coordination, and kill assessment.

The communications scenario for cooperative information sharing are characterized by networks or groups of subscribers with access to other subscribers information. Each subscriber needs total access to community generated data and an ability to select for reception only data that is relevant.

Current channelized radio systems provide only fragmented connectivity, can not provide total accessibility, and suffer serious loss of a platform's transmission capacity as its community size increases and receptions block use of transmitter. Identified needs for information sharing between force elements are real, can be expected to increase, and will overwhelm the capacity of existing structured communication systems. The inability of traditional communications to support these needs will inevitably result in truncation of a group's real requirements, minimal sharing of information among groups, and thereby, reduced battle-force capability. Traditional radios, with their reliance on time and frequency guardbands have inefficient system capacity due to their inefficient use of time and frequency spectrum resources. The basic cause of the inefficiency is traditional radio's inability to receive while concurrently transmitting. As one will understand, a radio's transmitter always served as a jamming or interference source for its receiver.

In a community of diverse platforms and multiple media, effective data exchange is frustrated by mismatches in radio circuit structures, timing, and link protocols. These structures and protocols have been used to organize participation to prevent transmitter blocking of receptions and vice versa. Many types of sequential access protocols have been developed to deal with the current necessity for sequential, mutually exclusive transmissions and receptions.

Data interoperability would benefit significantly from technology which eliminates the need to protect receptions from transmissions. High quality, secure, economic, hear-while-talk, bandwidth efficient voice communications is a long standing need. Previously, low cost voice digitization solutions required too much bandwidth; lower bandwidth solutions required costly processing and are vulnerable to noisy acoustic environments. Traditional radio's constraints also demand the complex preassignment of communications resources. The communications planner preassigns frequency channels in time slots in order to separate transmissions and receptions while attempting to achieve the kind of activity that satisfies the missions communications needs. A communication system is needed which avoids the complexity of the communication planners tasks; gives the platform more capacity, more autonomy, and dynamic platform-determined accessibility to data; and addresses the growing needs to support the real time engagement coordination functions.

Many communications systems employed today with their sophisticated spread spectrum and/or frequency hopping techniques tend to have poor reliability. Radios with good mission reliability will be more essential as information exchange between friendly forces becomes increasingly important to mission success. The communication system to be described has applicability in regard to military and other communication systems where the platform diversity may include aircraft, ground transportation, as well as sea-going vessels.

The overall object of this communication system is to increase available system communication capacity by an order of magnitude. The system provides total access to the community's transmissions and overcomes today's fragmented connectivity. The system further allows each subscriber to dynamically select for reception only those data messages or voice that are relevant to that subscriber. The system enables hear-while-talk voice as a low cost function within the multi-function transceiver employed. The system further provides data inter-operability by use of a single common basic waveform structure and by avoidance of circuit oriented timing structures.

These and other aspects of the system provide improved mission reliability and simpler maintenance through a radio architecture based on pooled, simplified functional modules and automatic fault isolation.

BRIEF DESCRIPTION OF FIGURES

FIG. 3A, 3B, and 3C are diagrams depicting the timing format employed by this invention.

FIG. 7 is a diagram depicting the time, frequency and phase patterns employed according to this invention.

BRIEF DESCRIPTION OF PREFERRED EMBODIMENT

A preferred communications system is the type including a plurality of subscribers forming a community, each of said subscribers having a transceiver including a transmitter and a receiver, comprising means coupled to each of said transceivers to enable said transmitter to transmit a unique waveform having a predetermined time, frequency and phase (TFP) code, and including means coupled to said receiver to enable any one of said subscribers to receive any transmitted waveform while other of said subscribers including those receiving said waveform can simultaneously transmit other unique waveforms, whereby any subscriber can receive any transmitted waveform while simultaneously transmitting another waveform.

DETAILED DESCRIPTION OF THE INVENTION

Figure 1:
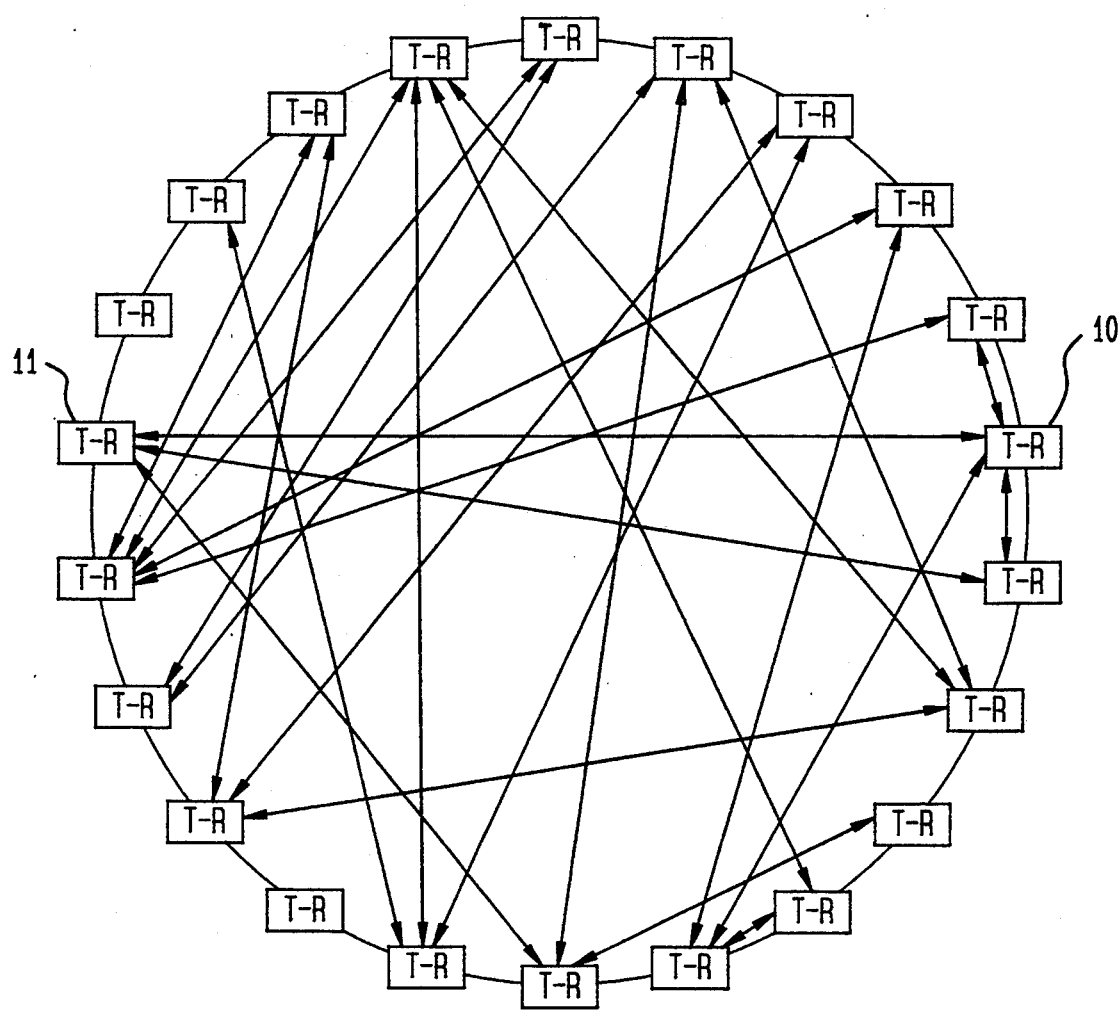
FIG. 1 is a simple block diagram depicting a community of subscribers to the system according to this invention.

Referring to FIG. 1, there is shown a plurality of units or users each of which is designated by the letters T-R standing for Transmit-Receive or transceiver such as units 10 and 11. As will be further explained, each of the units as 10 and 11 can communicate with any unit, receive any data that is being transmitted and simultaneously transmit and receive. The units are shown arranged in a circular configuration which model is purely arbitrary and necessary just to explain the operation of the system and to show an important distinction from classic linear or one-transmitter-at-a-time, one-way channel models. As will be further explained, each of the units as 10 or 11 can be airborne, on the ground or at sea still enabling communication with any other unit. The size and geometry of the configuration shown in FIG. 1 is arbitrary, and for the sake of an example is referred to as a community.

The plurality of transceiver units or T-R units 10 and 11 enables the community to exchange information and to receive and transmit information which is important to other people or platforms in the community. In this manner, one maximizes the participant's ability to transmit, at high power, outgoing data, voice, and positioning signals of potential importance to others. The others can be any of the units who have a need or desire to receive this information. Each T-R unit retains the ability to receive, generally at lower signal levels, incoming information of interest or importance to himself. In this manner each of the T-R units can transmit at high power levels and concurrently receive at lower power levels information that is of interest to the particular T-R unit. This information exchange orientation is enabled by a time dispersed, redundancy coded signal format which also allows timing and access flexibility, concurrency, and thus independence of users and usages. It is distinctly different from the traditional orientation of maximizing a community's occupation of a frequency channel by requiring coordinated, arranged use of time concentrated, self-blocking signal formats.

Figure 2:
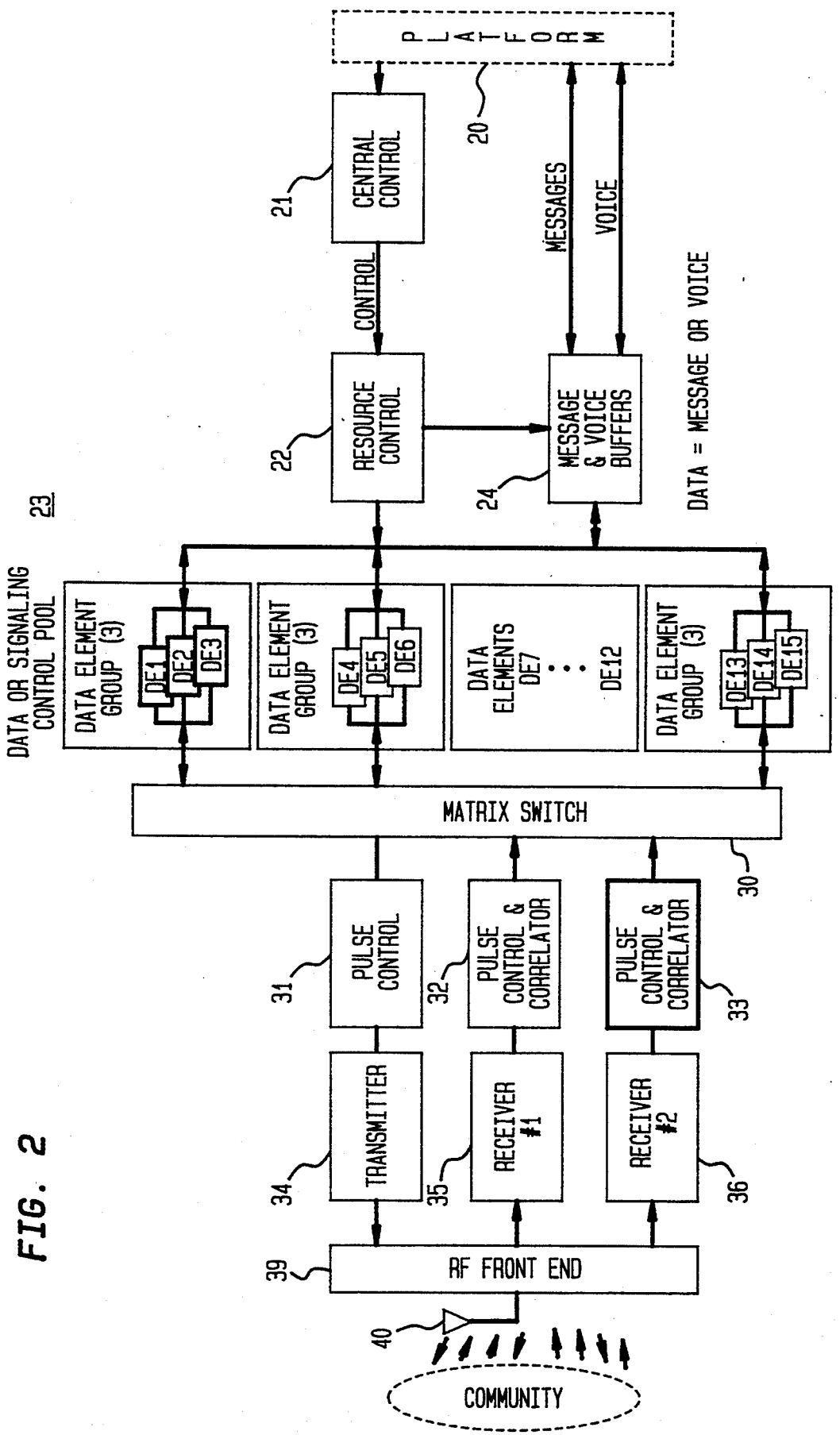
FIG. 2 is a block diagram showing a typical transceiver employed in conjunction with this invention.

Referring to FIG. 2, there is shown a block diagram of a typical T-R unit such as 10 or 11 employed in the community of units as shown in FIG. 1. It is noted that each of the T-R units in FIG. 1 are of the format shown in FIG. 2.

Shown in FIG. 2 is a platform 20 which is indicated by dashed lines. The term platform indicates the type of unit that the particular transceiver is on or associated with such as an aircraft, a naval vessel or ground transportation such as a truck, jeep, tank and so on. Depending on the platform 20, the unit may be programmed in different ways.

Shown coupled to the platform is a central control module 21. The central control module 21 initializes the transceiver unit based on an initialization load or control/display input from the platform. This essentially tells the receiving unit or the radio which data functions to support. As will be explained, the platform as interfacing with central control 21 has certain requirements in the way of displays which may be located on the dashboard or in the cockpit. Hence each module is programmed via central control 21 in order to enable it to function at the most efficient level with the platform requirements. As seen, central control 21 interfaces with a module 22 designated as resource control. Both central control and resource control may include mini or microprocessors and contain memory and control.

Resource control 22 interfaces with the data or signaling control pool 23 and also interfaces with message and voice buffer modules 24. The message and voice buffer modules 24 enables bidirectional communications with the platform 20 in order to enable the platform 20 both to send messages and receive messages from and to the message and voice buffers 23. This occurs both in regard to digital messages as well as voice. The message and voice buffers 24 also communicate with the data or signal control pool 23 via a two-way channel.

As one can ascertain from FIG. 2, the data or signaling control pool 23 consists of a series of modules referred to as data element groups. Data element modules are arranged in groups and each T-R unit may have a plurality of such groups. Shown in FIG. 2 there are 15 data elements associated with the T-R module depicted in FIG. 2. There are five modules with three data elements in each modular group. The function of the data elements will be subsequently explained. As seen, each of the data elements receives inputs from the resource control 22 and the message and voice buffers 24, and each data element can communicate or send data to each of the modules 22 and 24. The exchange of information between data element groups and the resource control 22 and message and voice buffers 24 is bidirectional.

As seen, each of the data element groups and each data element in the group, for example, interfaces with a matrix switch 30. The matrix switch 30 enables coupling to a pulse control module 31, a pulse control and correlator module 32, and an additional pulse control correlator module 33. The pulse control module 31 is associated with the transmitter 34 while the pulse control and correlator module 32 is associated with a first receiver 35 with the pulse control and correlator module 33 associated with a second receiver 36. It is understood that each of the T-R units may have more than one receiver and hence have more than one pulse control and correlator module as 32 and 33. It is also understood that a particular T-R unit can have more or less than 5 modular groups of data elements or may have more or less than three data elements in a modular group.

Each of the transmitter and receiver modules 34, 35, and 36 is associated with a RF front-end module 39 which module interfaces with a antenna 40. The antenna 40 is utilized for both receiving and transmitting. The RF front-end 39 is capable of receiving the RF power signal from the transmitter 34 for transmitting the same via the antenna 40 and can receive incoming signals from antenna 40.

Transmission operation is as follows. The platform 20 initiates a transmission sequence by sending message or voice data to the message and voice buffers 24. The initiation of a transmission request via the platform 20 may be made by the operator of the vehicle or, more typically by computers within the platform. The central control 21 commands the resource control unit 22 to begin the transmission sequence. As indicated, both central control 21 and resource control 22 may contain micro-processors and essentially operate as computers as will be further explained. Resource control 22 searches the data or signal control pool 23 to find an available data element such as DE1 or DE6 within a group and so on. The resource control 22 selects and commands an available data element (DE) to begin the signaling waveform sequence which includes a preamble and a "FAG" which precedes every data transmission also known as a "STRING". The selected data element performs related signal processing which determines the time, frequency, and code for each pulse of the signaling's initial waveform, the preamble.

The preamble announces a transmission to the community and allows synchronization to the transmission as will be explained. The signal processing in the transceiver shown in FIG. 2 occurs while the data element prepares for the dispersion of the transmitted signals in frequency and code and uniquely in time. Just prior to the scheduled time for transmission of each preamble pulse, the single pulse's time, frequency, and code parameters are dispatched by the data element through the matrix switch 30 to the transmitter's pulse control unit 31. The pulse control 31 operates to tune the transmitter's frequency synthesizer or local oscillator and in real time controls the modulation and transmission of the single preamble pulse. The selected data element continues this process until all preamble pulses are transmitted. Then the data element is returned to the control pool 23 and is available for another assignment. While the preamble is being transmitted, the resource control module 22 selects and commands another data element from the data or signaling control pool 23 to begin signalling the tag-waveform sequence. The tag, which follows every preamble transmission, contains encoded data which identifies the upcoming data transmission and provides the transmission-security (TRANSEC) seed that will be used for the data waveform generation. The selected data element performs the TRANSEC-related signal processing which determines the time, frequency, and code of each pulse in the tag. It also adds coded redundancy.

As the time of transmission of a pulse approaches, the time, frequency and PN code parameters for the single pulse are dispatched through the matrix switch 30 to the transmitter's pulse control module 31. As for the preamble, the pulse control 31 provides real time control during the tags pulse transmission and is then available. The data element continues its dispatching process until all tag pulses are transmitted; it is then returned to the control pool 23 and 15 available for another assignment. While the tag transmission is under way, the resource control 21 selects another data element from the pool for the data string (wave form sequence). The message and voice buffers 24 send the data for transmission to the selected data element which performs the data encoding and the TRANSEC-related signal processing. Since both involve data words, the data sequence is essentially the same as the tag sequence as described above. The data element continues its data processing until the end of the data transmission. This completes a single transmission sequence. Multiple concurrent transmission sequences can occur. For example, assume that a long voice transmission is under way when new data is received from the platform. Another transmission sequence would be started. Other data elements would be assigned to its operations which parallel the ongoing transmission. Each active data element would individually access and send pulse parameters to the transmitters pulse control 31 via the matrix switch 30.

The above noted description briefly describe the transmission mode of the modules depicted in FIG. 2. During reception the radio becomes synchronized to the community (network) time through a net entry process. Assume that the radio has successively completed net entry. Resource control 22 next assigns a data element to the reception processing for the signaling's preamble. A preamble signal can be received at any time, so this is a continuing assignment. The preamble's pulses are separated by a time that is greater than the propagation time to the furthest subscriber. The data element continually performs preamble signal processing and via the matrix switch 30 selects one of the receiver's pulse control and correlator elements as 32 and 33 for the reception and correlation of the current preamble pulse. The receiver as 35 and 36 is open for the entire range uncertainty time and reports all detected pulses and each time of arrival (TOA) back to the data element.

Each preamble has N pulses (N is selected at 16) and a preamble detection is declared when M of N pulses at nearly identical range are detected. This processing which detects multiple concurrent preambles from the community is also performed by the data elements. The detection of multiple concurrent preambles employs an algorithm to detect preamble pulses based on frequency, amplitude and time. A data element is assigned or selected by the matrix switch and is coupled to the pulse control and correlator to do such processing. The TOA of a detected preamble is reported to resource control 22 which selects and commands a data element from the pool 23 to begin the signal processing for the tag waveform. As with transmission, the data element performs the TRANSEC-related signal processing which determines the time, frequency, and code for each pulse of the tag. On a pulse by pulse basis these parameters are dispatched via the matrix switch 30 to one of the receivers pulse control and correlator elements 32 and 33 for the reception, correlation and data demodulation of each tag pulse. The pulse control and correlator 32 and 33 sends the detected data character back to its controlling data element. When all pulses of a code word have been received, the code word is decoded to overcome character errors or erasures. The data element sends the tags TOA and its decoded data to resource control 22 and returns to idle.

As noted with the transmission sequence, the T-R unit is controlled by central control's 21 interpretation of initialization load or control/display inputs from the platform 20. The platform 20 instructions identify which data types the radio should receive and send to the platform 20. Central control 21 formats and sends this list of relevant data types to resource control 22. The received tag's data includes the identity of its following string data or voice transmission and TRANSEC seed that will be used by the transmitter for the data waveform generation. The tags data ID is compared to the platform's list of relevant data. If there is no match, the data is not pursued. If there is a match, resource control 22 selects a data element for its reception and gives the element the data waveform's expected TOA and TRANSEC seed. Using the transmitter's TRANSEC key, the data element determines the time, frequency, and code for each data pulse. As with the tag these parameters are dispatched per pulse to an available receiver as 35 and 36 via the associated pulse control and correlator 32 and 33. The received characters are formed into words, decoded and sent to the message and voice buffers 24. The data is then dispatched to the platform 20 which completes the data reception sequence. Multiple concurrent receive operations will be the rule rather than the exception. Transmissions begin when data is available, not at preassigned times. In this manner the communication planner's complex task of allocating time slots, as with a time division multiple access (TDMA) system, is eliminated.

With a large community there can be a substantial number of concurrent transmissions from its members. Thus multiple data elements will be concurrently assigned to the reception of preambles, tags and relevant data. The size of the data or signaling control pool 23 is primarily determined from the expected concurrency of received tag and relevant data sequences. The data or signaling control pool 23 also supports transmissions. The necessary number of receiver and pulse control and correlator combinations is determined from the number of pulses that one expects to receive simultaneously. As shown in FIG. 2 the architecture of the TR unit includes queued pools of data elements as for example three in a group and pools of receivers as 35 and 36 and pulse control and correlator modules 32 and 33. The architecture has benefits in that there is a commonality of modules and as an integral part of normal operation there is a ready isolation and by-passing of a faulty common module such as a faulty data element or a faulty receiver and so on.

In referring to FIG. 3a, FIG. 3b, and FIG. 3c there is shown the timing and waveform structure which is employed in the system described herein. As will be explained the systems time-dispersed signal waveform removes the basic road block to efficient information exchange among the various members of the community as for example shown in FIG. 1. Information exchange within today's radio communities is hampered by the inefficiencies of traditional radio technology. Traditional transceivers using time concentrated signals, are limited to the two extremes of transmitter (intratransmission) duty factors, 0.00% (off or not transmitting) and 1.00% (on or not receiving) and therefore cannot receive while transmitting. Just as the deleterious effects of frequency concentrated jammers can be avoided by frequency dispersion, the effects of time concentrated self-jamming caused by ones own transmitter can be avoided by time dispersion and redundancy coding of the transmitted signal. By dispersing its transmitted signals in frequency and more fundamentally in time and by redundancy coding, the transceivers according to this invention operate at intermediate (intratransmission) transmitter duty factors which permit reliable receptions while concurrently transmitting. The achievement of a receive while transmit capability allows the elimination of circuit structures and protocols whose basic goal was the separation of time-concentrated transmissions and receptions. The avoidance of separation structures and protocols permits much greater use of the time and frequency spectrum and thereby provides at least an order of magnitude increase in useful capacity. The avoidance of separation structures and protocols also eliminates the complex planning for simultaneous separations and intracommunity connections.

The system further simplifies communications planning by not requiring the planner to predict and assign resources for peak mission dynamics. Total access to the community's data voice transmissions by each subscriber within a community derives from the receive while transmit capability and the avoidance of separation structures and protocols. All data transmissions are preceded by a signaling waveform which identifies the data. Total access to data means that each community subscriber receives all signaling waveforms and is thereby notified of impending data transmissions. Since the transceivers can receive (signaling) at all times, the signaling waveforms from all other subscribers are received. None are blocked, as with traditional radios, by channelization or self-jamming transmissions or by circuit structures and protocols. In addition the pseudorandom time, frequency and phase code dispersed signals are compatible with antijam (A/J) and low probability of intercept (LPI) technologies.

As will be explained the transceiver's, as for example shown in FIG. 2, signaling capability notifies each subscriber of an impending data transmission, and allows each subscriber to dynamically select, for reception, only data (messages or voice) that are relevant to the subscriber. In this manner receive resources are not wasted by waiting for a data reception or by receiving non-relevant data. In contrast, the traditional receiver is preassigned to a function (for example voice) even though the function may be active only a small percentage of the time.

Referring to FIG. 3 there is shown in FIGS. 3A, 3B and 3C the timing and waveform structure employed in this system. The waveform which is transmitted as shown in 3A consists of a signaling group and a data string group. Basically the signaling group consists of a preamble and a tag group which consists of two separate tags. The string group is used to transmit or receive data channels of voice or messages. As seen the string group can be up to four independent and time orthogonal 16k bits/seconds strings. These strings can be merged into string sets (of two or more strings) to support data rates that are higher than one string can support. Even if four strings are active the data pulses within the strings are time orthogonal sets and will not mutually interfere.

The data strings as shown in FIG. 3A illustrate an example where four strings are grouped into three sets. For example strings A and B are employed to support a 32k bits/second air-track reporting channel, string C is utilized for a 16k bits/second voice channel while string D is used for a 16k bits/second report channel. Thus the data strings can be utilized in combination or individually. While 16k bits/second is shown as a typical data string bit rate, it is understood that other bit rates could be employed. Basically as seen in FIG. 3A the information string is a series of data pulses that are cryptographically dispersed in time, frequency and spread-spectrum space as for example by use of direct spreading. String data is cryptographically enciphered. All parameters defining the characteristic of the string group including partial seed data used for cryptographic detection and deciphering of the strings are broadcast within the preceding signaling group. The signaling group as seen in FIG. 3A consists of a series of cryptographically dispersed pulses and starts with a preamble that is used for coarse acquisition.

A cryptographic, pulse position modulation scheme is employed for the community-wide preamble waveform which minimizes mutual interference even when several participants are simultaneously broadcasting a preamble. The preamble as seen in FIG. 3A is followed by the first of two tag groups which identifies the type of data channels embedded in the forthcoming data strings. The first tag is used by receiving subscribers to determine if all, some or none of the string group warrants reception. The tags embedded data is enciphered. The cryptographic seed used for first tag signal recovery and deciphering are known by the community. The first tag also includes enciphered emitter-dependent seed to be used to recover and to decipher the second tag group in the forthcoming strings. The second tag defines the partitioning of the data strings into groups, the length of each string, and other string attributes needed to receive and reconstruct the channelized data.

In the system, any participant in the community as shown in FIG. 1 can transmit data at any time thereby allowing rapid and open accessibility to the communication network. Thus the system does not require an a-priori mission set-up of transmit assignment opportunity times such as required in prior art systems.

Again referring to 3A, a typical transmission consists of the signaling and the data strings as shown in 3A and designated as panel A. There are a series of pages. A page is defined as a 10 millisecond interval of time.

Shown in FIG. 3B is a page interval which consists of a number of bin intervals. There are 800 bin intervals in a page. Panel C which is shown in FIG. 3C shows the data relationship for the data channels where there is shown the two 16K bits/second strings which are string A and string B. String C and string D are shown in column form. It is seen that the pages consists of data characters as well as tracking information. Basically the figure also depicts how the data in each of the bins as defined is stored including the particular algorithms utilized for the different pages of data as shown in the format. Thus the entire structure of the waveform utilized in this system is depicted in FIGS. 3A, 3B and 3C.

Figure 4:
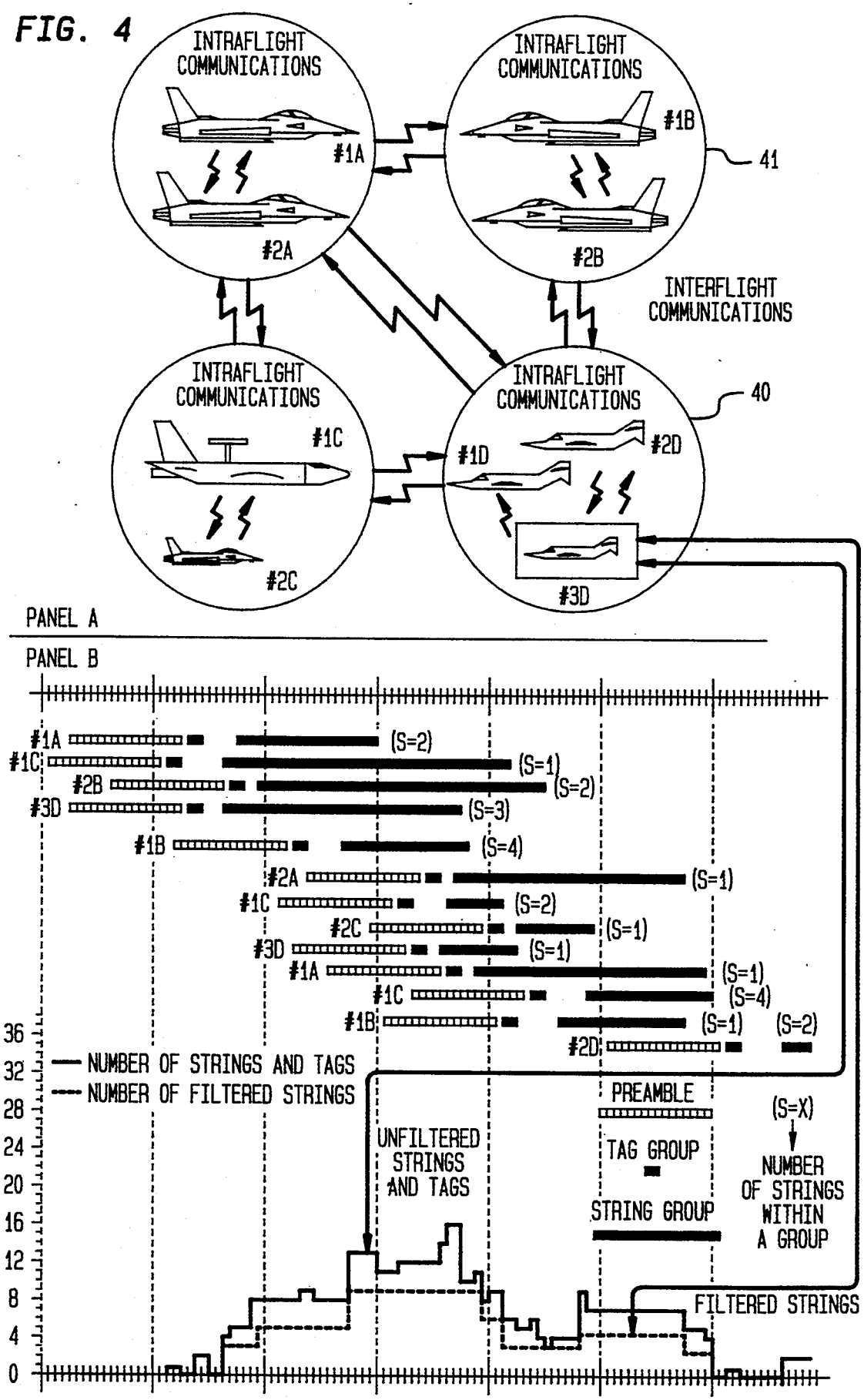
FIG. 4 is a timing diagram and a pictorial showing communications according to this invention.

Referring to FIG. 4 there is shown a typical scenario depicting several intra and inter flight participants and hypothetical tag and string activity. The composite transmitted waveforms are shown in panel B. Each participant is subjected to all signalling including preamble and tags and data string emissions in the theater or location (community). The upper histogram is the hypothetical composite (unfiltered) tag and string activity at aircraft #3D which is shown for example in module 40. Module 41 shows the activity of aircraft 1B and 2B and so on.

As seen each participant reads the tags to identify the data type and only passes through its filter and receives data strings suited to its mission role. As indicated in module 40, aircraft number 3D filtered string activity peaks at ten concurrent data strings and therefore its radio needs only ten data elements to fulfill its peak data requirement. This can be seen basically in regard to panel B. Each of the aircraft depicted is capable of transmitting and receiving any of the strings and tags within the community shown. As indicated a waveform for a 16K bits/second data rate is shown but as indicated above the system will accommodate alternative waveforms and data rates.

As one will further understand and again referring to FIG. 2, the number of data elements which appear in a data or signalling control pool 23 is a function of the platform as for example aircraft, ground transportation and so on. All the transceiver configurations are similar but the number of data elements and receiving modes can be varied to match the host platform required data rates. Thus the data element which is the major T-R unit component acts independently as a signal processor of a string, a tag, or a preamble. These elements which are the data elements are dynamically assigned to either receive or transmit one string (or tag) at a time. This assignment can be under control of resource control module 22 operating in conjunction with the central control 21. The illustrated pool shown in FIG. 2 of 15 data elements permits concurrent transmission and reception of 15 independent strings and/or tags. The data elements are networked to a set of receiving nodes and a transmit node as specified by means of the non-interfering crossbar matrix switch 30. These receiving and transmit nodes have no affiliation to a specific string or tag, but serve the pool of data elements on a pulse to pulse basis.

Figure 5:
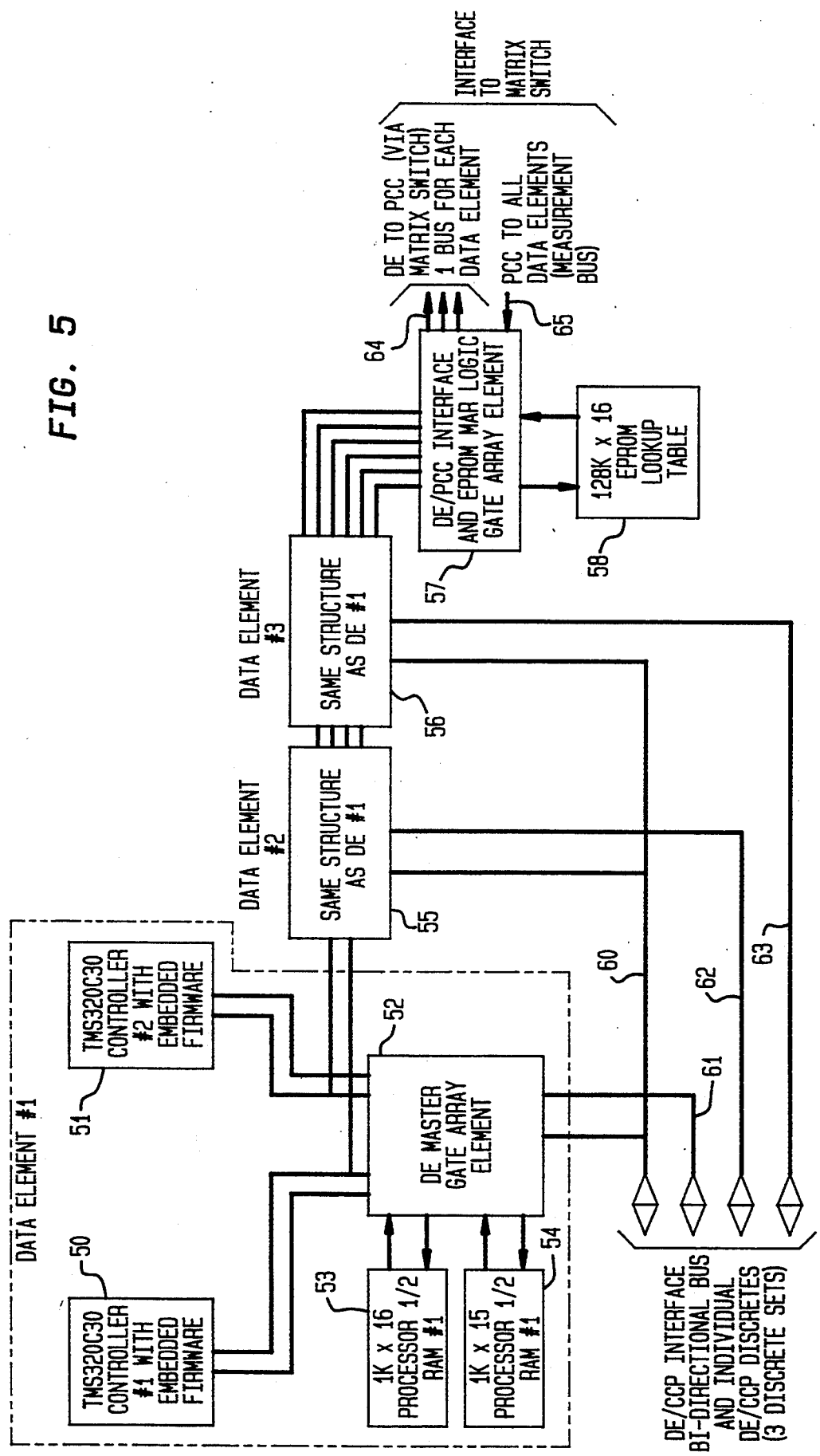
FIG. 5 is a block diagram showing a data element group according to this invention.

Referring to FIG. 5 there is shown a more detailed block diagram of a typical data element group which basically consists of 3 data elements namely as shown in FIG. 5 as data element number 1, data element number 2 and data element number 3. Essentially each data element consists of a first and second controller 50 and 51 having hardware embedded therein. The controller's essentially operate in conjunction with a master gate array 52 which is a programmable array and which interfaces with randomaces memory 53 and 54. As seen, each of the data elements such as 55 and 56 have exactly the same configuration as the data element first described. The outputs of each of the data elements interface with a common-bus 60 which is directed to the resource control processor 22 shown in FIG. 2 as well as to the message and voice buffers. Each data element has a separate output line 61, 62 and 63 so that it can be controlled and assigned accordingly. The data elements communicate one with the other in each of the groups and as such interface with a module 57 designated as interface logic with a gate array.

Essentially the module 57 contains suitable interface logic as well as an electronically erasable programmable read only memory module (EPROM) to enable the interface 57 to control a programmable gate array for purposes of performing data element tasks as previously described. The module 57 interfaces with a look-up table which may be in the form of a EPROM 58 to enable programming of the data element module in regard to task formations and so. The interface module 57 couples to the matrix switch such as switch 30 of FIG. 2 and includes one bus for each of the data elements. Therefore as shown in FIG. 5 for three data elements there are three buses coupled to the matrix switch. Further more, an input designated on lead 65 is directed to each data element module from the pulse control and correlator or PCC 33 or 32 shown in FIG. 2.

As indicated previously the preamble signal can be received at any time. The preamble pulses are separated by time and the data element continuously performs preamble signal processing and via the matrix switch selects one of the receivers pulse control and correlator elements for the reception and correlation of the current preamble pulse.

Figure 6:
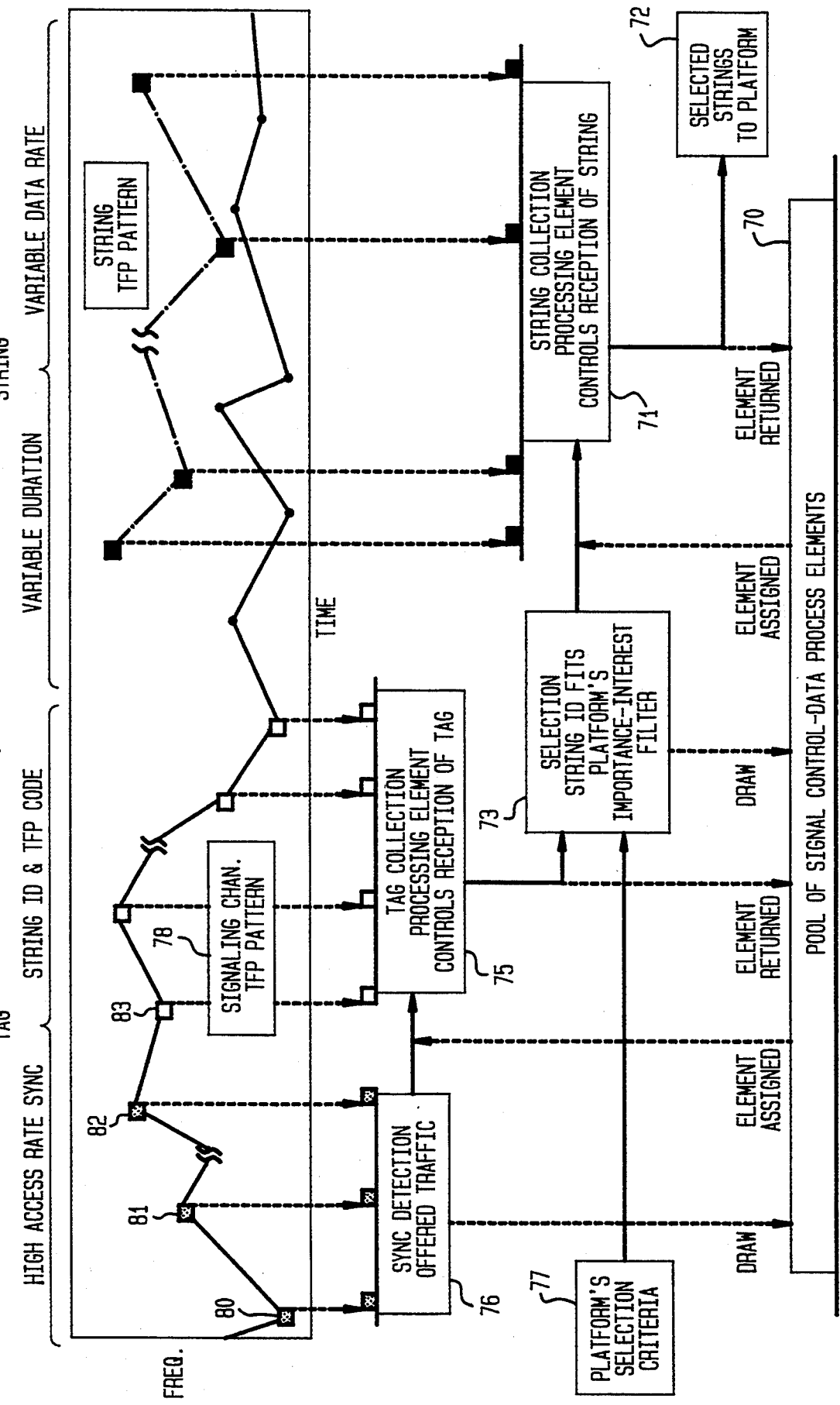
FIG. 6 is a timing and flow diagram depicting the use of a processing element pool according to this invention.

The data element as shown in FIG. 5 contains processing elements such as the controllers 50 and 51 and further the interface 57 has its own processing capabilities. As indicated previously each preamble has a number of pulses and preamble detection is declared when a given number of pulses at nearly identical range are detected. The rather sophisticated processing which must detect multiple concurrent preambles from the communities is also performed by the data elements as shown in FIG. 5. Referring to FIG. 6 there is shown a block diagram depicting the pool of signal control data process elements 70 which essentially corresponds to the pool 23 shown in FIG. 22.

As indicated in FIG. 6 there is shown a transmitted signal which essentially constitutes a tag and a string. As one can see from the tag and string signals as depicted, the object of the present system is to transmit a series of pulses which are designated and different by having a unique time, frequency and phase pattern (TFP). In this way, each pattern which is basically defined in the signalling channel as indicated by module 78 is unique and constitutes a three dimensional pattern which is unique to each string transmission. In this manner by knowing the pattern which is transmitted along with signalling information the receiver can continue to select the data that it requires. Thus each of the data processing elements or data elements as employed in the data element group can be assigned to recognize different patterns as well as multiple patterns and select only those patterns and data which is necessary to the particular platform.

Thus the main aspect of this system is dispersion with redundancy whereby there is transmitted unique time, frequency and phase (TFP) patterns which enable one to discriminate and select a unique three dimensional pattern as for example shown in FIG. 7. The three dimensional pattern is described and depicted in terms of frequency and time. The shape or nature of the wave form as for example how the pattern is formed determines and enables each receiving element to select and continue to respond to that pattern. The processing is done by the data element groups which are assigned.

For example as shown in FIG. 6 a first pulse designated by reference numeral 80 is followed by a second pulse 81, by a third pulse 82, another pulse 83 and so on as shown by the dash line connections. This represents a particular pattern. Therefore, by means of the data elements which respond to the signalling channel one can now select that pattern 78 after it is known. In order to accomplish such results the platform has selection criteria as indicated by module 77. This selection criteria is programmed or selected by the platform thus the selection as indicated by module 73 is implemented by selecting a string identity which fits the platforms interest. The platform can select strings of data or messages which it is concerned with as is indicated by module 71 and which strings of data are sent to the platform as indicated by module 72. The data processing elements can respond to the sync. The sync detection module 76 denotes that sync detection is performed by an assigned data element which also has a seed sequence stored therein to recognize the sync pattern. In this manner knowing the nature of the transmissions as for example in FIG. 3 the detection of sync enables the data elements to now respond to the tag data.

As seen in FIG. 6 the tag consists of the high access rate sync followed by the string ID and TFP code. The TFP code is the time frequency phase code which is unique and defines the particular signal pattern as for example shown in FIG. 6. The tag collection module 75 which is another processing element controls the reception of the tag which essentially enables the selection module 73 to therefore select those tags of interest to the particular platform and therefore the strings associated with the tags as indicated by module 71. Once a tag has been defined and is an acceptable tag then the string collection module 71 controls the reception of the string which string has a TFP pattern as shown in FIG. 6. It is immediately noted for example that many TFP patterns exist but the system is able to select all TFP patterns or TFP patterns which are of interest to the platform depending upon the tag and thereafter collect the string of data associated with those patterns and with those tags.

Again, referring to FIG. 7 there is again shown a plot of frequency versus time. There is depicted therein a unique three dimensional pattern designated by reference numeral 90. The pulse pattern which is connected by the dash lines is unique in that it is specified in time, frequency and phase (TFP) and hence is different from any other pattern which for example may include the various different crosshatch elements. By optimally using the three dimensional aspect of time, frequency and phase one can now select anyone of those transmitted patterns from space. In this way each TFP pattern can be discriminated and selected. Further more, utilizing the TFP pattern allows concurrent transmit and receiving by each platform. The reason for this is that the platform will transmit in a completely different TFP pattern when it is receiving than when it is transmitting. Thus based on strict randomness of the system one can transmit and receive based on such patterns and assure that there will be no interference as for example implemented by conventional systems.

We claim:

1. A communications system of the type serving a plurality of subscribers forming a community of interest, comprising a plurality of transceivers for use by said plurality of subscribers, each of said transceivers including a transmitter and a receiver and further comprising:

means for enabling said transmitter to transmit a unique waveform having a predetermined coding that is a function of time, frequency and phase;

means for enabling any of said receivers to receive any transmitted waveform from a transceiver used by one of said subscribers while at the same time another unique waveform is being transmitted from the transceiver associate therewith;

whereby any subscriber is enabled to use its transceiver to receive any transmitted waveform from a transceiver in use by any one of said plurality of subscribers while simultaneously transmitting another waveform; and wherein said transmitted waveform includes a series of pulses comprising a transmitted message, said pulses comprising a unique three dimensional pattern in space manifesting said predetermined coding, wherein each series of pulses is characterized as having a tag following a preamble which tag contains encoded data identifying the upcoming data transaction portion of the message and wherein said preamble operates to announce a transmission for enabling any subscriber to synchronize to said transmission.

2. The system according to claim 1 wherein said tag includes data which identifies a seed to be used for waveform generation.

3. The system according to claim 1 wherein each preamble includes N pulses, wherein said transmitted message contains N and M pulses where M and N are positive integers with M being at least 10 times larger than N.

4. The system according to claim 1 wherein said receiver further includes means responsive to any transmitted message to receive and detect said message and to provide an indication of the time of arrival (TOA) of a detected message.

5. The system according to claim 4 wherein said detected message is the preamble and further includes means responsive to the detection of said preamble to process said received signal to detect said tag waveform.

6. The system according to claim 5 including means responsive to said detected tag waveform to process said waveform to determine said predetermined coding for each pulse associated with said tag.

7. The system according to claim 1, wherein said tag comprises a first and a second tag, wherein said first tag includes means for identifying the type of data contained in said transmitted message and further includes seed information necessary to decode the second tag information and the data contained in said message and wherein said second tag includes means for defining the partitioning of the data contained in said message into groups.

8. The communication system according to claim 1, wherein each transceiver further comprises, an antenna means including an RF front end which operates to receive and transmit signals for coupling to a separate transmitter and receiver, and wherein said transmitter is coupled to a pulse control means for applying predetermined pulses to said transmitter to be transmitted by said antenna via said front end, and means coupled to said pulse control means for selecting a pulse format for transmission of said message.

9. The communication system according to claim 8 wherein said means coupled to said pulse control means includes a first central control processor responsive to said subscriber to provide a control output signal indicative of the transmission sequence associated with said subscriber, a resource control processor coupled to said central control processor operative to commence a transmission sequence, a plurality of data elements having input ports and output ports, with the inputs coupled to said resource control processor and with the outputs coupled to said pulse control means, said resource control processor operating to select any of said data elements to begin transmission and processing of said pulse format.

10. The communications system according to claim 9 wherein each transceiver, further includes at least one receiver having an input coupled to said RF front end for receiving signals and having an output, a pulse control and correlator having an input coupled to said receiver output for receiving and correlating said signal, and means coupled to said pulse control and correlator for detecting said preamble of said waveform.

11. The communication system according to claim 10 wherein said means coupled to said pulse control and correlator includes a selected data element.

12. The system according to claim 1 wherein said unique waveform includes a series of RF pulses which comprise said transmitted message.

13. A transceiver for receiving a first transmitted signal having a unique pulse pattern, said pulse pattern being a function of time, frequency and phase and for transmitting simultaneously, while receiving, another signal having another unique pulse pattern, said another pulse pattern being a function of time, frequency and phase, comprising:

front end means which operates to receive a transmitted signal or transmit a signal, first processor means coupled to said front end means for responding to a first transmitted signal and to monitor said unique pulse pattern as transmitted, second processor means coupled to said front end means for providing another unique signal having a pulse pattern which is a function of time, frequency and phase to enable said pattern to be transmitted while said first transmitted signal is being received; and wherein each pulse pattern has a preamble pulse portion which determines the time frequency and phase for each pulse in said pattern, and a tag portion which identifies the transmission and the data contained therein.

14. The transceiver according to claim 13 wherein said second processor means includes message and voice buffer means which operates to receive data to be transmitted.

15. The transceiver according to claim 13 wherein said front end means includes an antenna for receiving and transmitting signals.

16. The transceiver according to claim 13 wherein said first processor means includes first means for detecting said preamble and second means for detecting said tag.

17. The transceiver according to claim 13 wherein said second processor means includes first means for forming a preamble and second means for providing a tag position for said transmitted pulse pattern.

18. The transceiver according to claim 13 further including a plurality of processors coupled to said first and second processor means and wherein one or more processors comprising said plurality of processors are selectable by either said first or second processor means for processing signals according to the time, frequency and phase relationships characterizing a pulse being so processed.

19. The transceiver according to claim 13 wherein said pulses within said transmitted pulse train are randomly dispersed in time, frequency and phase.

20. The transceiver of claim 13, wherein said unique pulse pattern is comprised of a series of RF pulses.

* * * * *